US005437545A

United States Patent [19]

Hirai

[11] Patent Number: 5,437,545

[45] Date of Patent: Aug. 1, 1995

[54] METHOD AND APPARATUS FOR EXTRUDING POWDERED MATERIAL

[75] Inventor: Yoshiki Hirai, Tokyo, Japan

[73] Assignee: Hitachi Powdered Metals Co., Ltd., Chiba, Japan

[21] Appl. No.: 68,084

[22] Filed: May 28, 1993

[30] Foreign Application Priority Data

Jun. 5, 1992 [JP] Japan .................................. 4-170029

[51] Int. Cl.[6] .............................................. B29C 47/00

[52] U.S. Cl. ...................................... 425/79; 264/120; 264/176.1; 264/209.1; 425/380; 425/382.4; 425/467

[58] Field of Search ............... 264/109, 118, 120, 123, 264/176.1, 209.1; 419/67; 425/78, 79, 376.1, 380, 382.4, 461, 467

[56] References Cited

U.S. PATENT DOCUMENTS

| | | | |
|---|---|---|---|
| 2,289,787 | 7/1942 | Kaschke et al. | 425/79 |
| 2,348,172 | 5/1944 | Taylor | 425/79 |
| 2,696,640 | 12/1954 | Wienand | 425/382.4 |
| 2,817,113 | 12/1957 | Fields | 425/380 |
| 3,295,166 | 1/1967 | Owings | 425/380 |
| 3,694,127 | 9/1972 | Takahashi et al. | 425/78 |
| 4,217,140 | 8/1980 | Waldhuter et al. | 425/79 |
| 4,420,294 | 12/1983 | Lichtinghagen | 425/79 |
| 5,116,659 | 5/1992 | Glatzle et al. | 419/67 |
| 5,156,854 | 10/1992 | Yamada | 425/78 |
| 5,242,293 | 9/1993 | Klump et al. | 425/467 |
| 5,259,744 | 11/1993 | Take | 425/78 |

FOREIGN PATENT DOCUMENTS

| | | | |
|---|---|---|---|
| 2-34702 | 2/1990 | Japan | 425/79 |
| 1052337 | 11/1983 | U.S.S.R. | 425/79 |
| 1189572 | 11/1985 | U.S.S.R. | 425/79 |
| 1258624 | 9/1986 | U.S.S.R. | 425/79 |
| 1637957 | 3/1991 | U.S.S.R. | 425/79 |

*Primary Examiner*—Charles S. Bushey
*Attorney, Agent, or Firm*—Sandler, Greenblum & Bernstein

[57] ABSTRACT

An apparatus for extruding a powdered material forms an elongated pellet. The extrusion apparatus includes a connection mechanism arranged between the inlet and the constriction passages for continuously connecting two successively charged portions of the powdered material when the powdered material is repeatedly charged. By this mechanism, the formerly charged and semicompacted portion of the powdered material and the border surface upon the subsequent portion are broken, either by a core piece or a modified die cavity, whereby the portions of the powdered material are merged with each other before the constriction.

11 Claims, 11 Drawing Sheets

METHOD AND APPARATUS FOR EXTRUDING POWDERED MATERIAL

BACKGROUND OF THE INVENTION

1. Field of the Invention

The present invention relates to a method and an apparatus for extruding a powdered material to form a pellet, and in particular to continuously compact the powdered material into an elongated body such as a rod, a pole, a tube and the like.

2. Description of the Prior Art

In the field of powder metallurgy, a powdered material is pressed into a pellet with a desired shape before sintering, and then a standard compression molding method, such as that disclosed in U.S. Pat. No. 5,156,854, is used for compacting the powdered material. In the compression molding method, a mold with a molding cavity and upper and lower punches are used, in which the lower punch is fitted in the bottom of the molding cavity before a powdered material is poured into the molding cavity. The powdered material is then compressed by applying the upper punch to the cavity. However, if an elongated pellet is desired, thereby requiring the molding cavity to have a large longitudinal depth in comparison with the area of the surface pressed by the punch, it is difficult to uniformly press all the powdered material in the molding cavity. Consequently, the use of this method is limited to manufacturing a pellet which has a short length relative to the area of the pressed surface, and it is impossible to form a continuous pellet by this method. Therefore, when a longitudinal pellet is the goal, an extrusion method has been conventionally used.

In the conventional extrusion method, the powdered material is ordinarily mixed with a binder, such as wax and the like for imparting moldability to the powdered material, and converted into a paste; the powdered material alone would easily fall out of the die cavity due to its flowability. The obtained paste is then put into the container of the extruder, in which an extrusion operation is performed in a manner similar to that for an injection molding machine, and extruded through a cavity to form an extrudate, which is sintered thereafter to obtain a sintered product. In most cases, however, it is necessary to subject the extrudate to an aftertreatment to remove the binder from the extrudate.

Moreover, in the case of employing a hot extrusion technique, the type of raw powdered material and the operating temperature must be carefully selected to avoid oxidation of the powdered material. However, if such a temperature selection is difficult and the use of a material which is expected to be oxidized at a high temperature is unavoidable, an encapsulation method must be employed. In the encapsulation method, the raw material is enclosed in a sheath under vacuum and then subjected to hot extrusion. This treatment prevents the raw material from being oxidized. However, except for some special cases, the extrudate needs to be further treated to remove the sheath by chemical dissolution, etc.

As described above, for implementing the conventional extrusion method, a variety of additional and complicated steps (i.e. the paste-forming step, the wax-removing step, etc.) are necessary before or after the essential extrusion process. Accordingly, the conventional extrusion method, particularly the hot extrusion method, has adverse effects on manufacturing costs.

Consequently, the technical field in which the extrusion method can be employed is at present limited to special cases in which the manufactured pellet has a high value added for economic reasons and in which the pellet manufactured by using the extrusion method can be imparted a particular property that cannot be obtained by the ordinary powder metallurgical method. For this reason, the extrusion method has not been generally utilized for manufacturing ordinary machine parts, in spite of the prominent characteristics present in that method.

SUMMARY OF THE INVENTION

It is therefore an object of the present invention to provide an extrusion method and an extruding apparatus for easily and successively extruding a powdered material without the use of binder material or the like to form an elongated pellet.

It is another object of the present invention to provide an extrusion method and an extruding apparatus for extruding a powdered material to continuously form a long compacted body.

In order to achieve the above-mentioned objects, a method of extruding a powdered material into a pellet according to the present invention comprises the steps of: charging the powdered material into a longitudinal die cavity including an inlet, an outlet and a constriction passage at which the die cavity is narrowed; applying a punch to the inlet of the die cavity for longitudinally pressing the powdered material charged in the die cavity to extrude the powdered material from the outlet of the die cavity; repeating the charging step and the applying step; continuously connecting two portions of the powdered material successively charged by the repeating step; and constricting the powdered material by means of pressure from the punch longitudinally applied to the charged powdered material so that the powdered material is laterally compressed through the constriction passage into a solid mass product.

Moreover, an apparatus for successively extruding a powdered material into a pellet according to the present invention includes a longitudinal die cavity into which the powdered material is charged, and a punch being adapted to be applied to an inlet of the die cavity for longitudinally pressing the powdered material charged in the die cavity to extrude the powdered material from an outlet of the die cavity, in which the die cavity comprises: a constriction passage with constriction means for constricting the powdered material by means of pressure from the punch longitudinally applied to the charged powdered material so that the powdered material is laterally compressed through the constriction passage into a solid mass product; and connection means arranged between the inlet and the constriction passage, for continuously connecting two successively charged portions of the powdered material when the powdered material is repeatedly charged.

As a result of the above configuration, the manufacturing cost for extrusion of powdered material can be reduced, and it becomes possible to widely apply the extrusion method to the manufacture of various machine parts.

BRIEF DESCRIPTION OF THE DRAWINGS

The features and advantages of the extrusion method and extruding apparatus according to the present invention will be more clearly understood from the following description of the preferred embodiments of the present invention taken in conjunction with the accompanying drawings in which identical reference numerals designate the same or similar elements or sections throughout the figures thereof and in which.

DETAILED DESCRIPTION OF THE PREFERRED EMBODIMENTS

Figure 1:
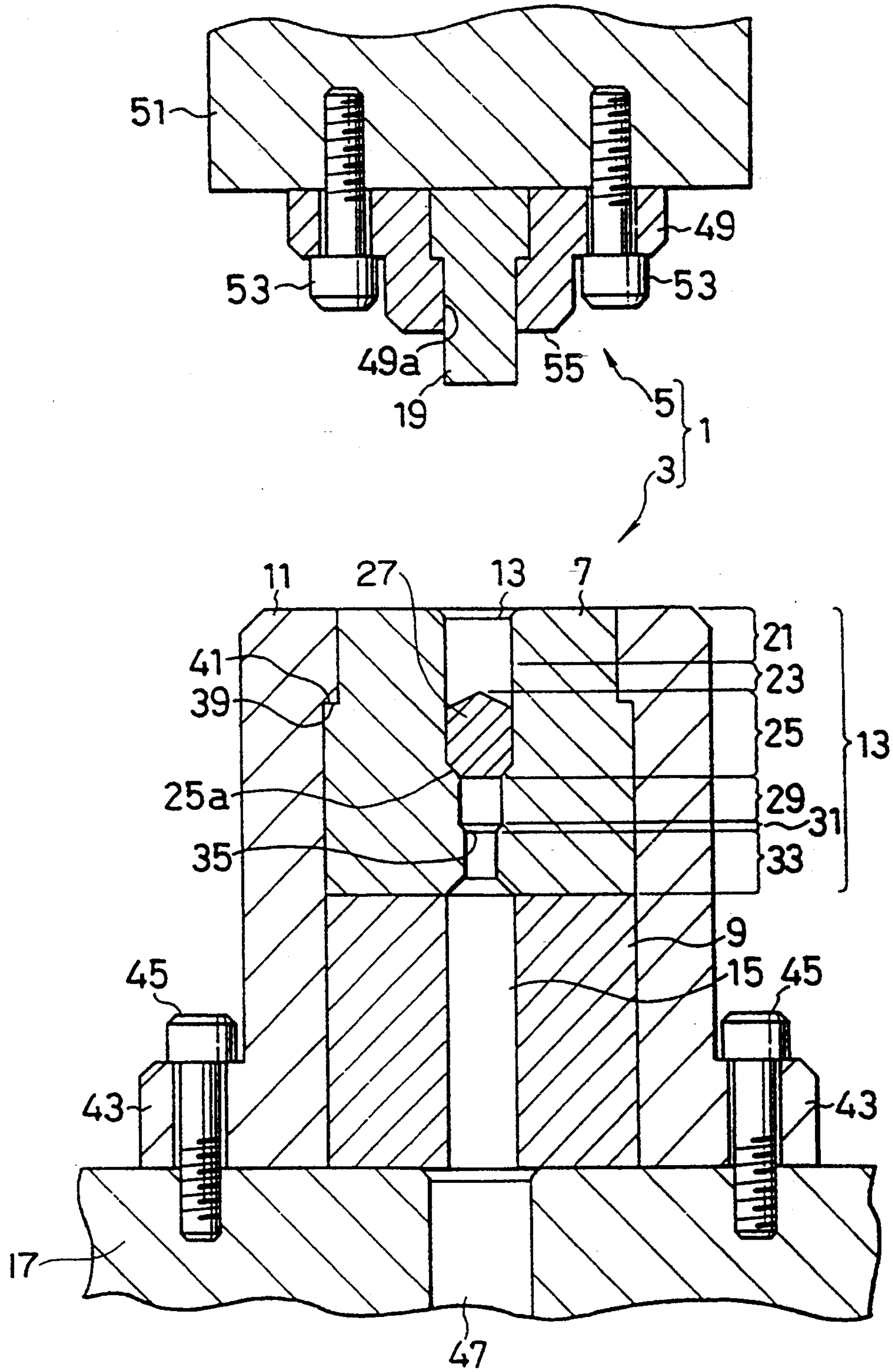
FIG. 1 is a vertical sectional view showing a first embodiment of the extrusion apparatus according to the present invention.

For solving, the above-mentioned problems, an extrusion method by which powdered material can be successively formed into an elongated compacted body has been accomplished by the present inventor. This extrusion method is practiced with an apparatus which basically comprises an axial die cavity with a constrictor portion.

Specifically, the die cavity includes a constriction passage interposed between first and second aligned cylindrical passages, wherein the diameter of the first passage is larger than that of the second passage. The die cavity is thus narrowed at the constriction passage to a shape like a truncated cone.

According to this structure, at the first step, a stopper piece made of deformable material is placed in the vicinity of the constriction passage for receiving and temporarily supporting the powdered material in the die cavity. Next, the powdered material is charged on the stopper piece and a punch is pressingly applied to the die cavity, thereby pressing and forcing the charged powder into the constriction passage. In this operation, the powdered material is radially compressed by the gradually constricting bore surface of the constriction passage while it is pushed into the second passage against the stopper piece, whereby the density of the powder is increased to a desired compacted density.

As a result of this pressing operation, the stopper piece is discharged from the die cavity and the charged powdered material is formed into a semicompacted body located in the vicinity of the constriction passage in place of the stopper piece. The steps of charging fresh powdered material and pressing the charged material with the punch are then repeated, thereby extruding the semicompacted body through the constriction passage and the second passage and further compressing it into a completely compacted pellet. Thus, by repeating the charging and pressing steps, manufacture of pellets can be carried out successively, and the pellet can be formed into a desired shape in accordance with the shape of the constriction passage at every pressing step.

In the extrusion method according to the above construction, however, a problem arises in that the longitudinal length of the manufactured pellet is limited by the depth to which the punch can reach in the die cavity. Namely, once the powdered material is pressed and semicompacted, the density of the powdered material increases and the upper portion of the powder forms a top end surface in which the powder particles are relatively tightly bound. Consequently, it becomes rather difficult to join the top end surface of the semicompacted powder and the powder portion subsequently added into the die cavity.

As a result, every charged portion of the powdered material is separately formed into a pellet, and one pellet is discharged at every pressing step. Accordingly, it is impossible to manufacture a continuously elongated pellet from an amount of powder exceeding the powder portion which is added at every charge. This results in an elongated die cavity and an elongated punch in accordance with the desired length of the pellet.

To explain this problem in more detail, a case example of iron-containing powder being subjected to compression extrusion will be described below.

Generally, the iron powder has a bulk density of about 3.0 g/cm$^3$ when it is filled in the die cavity. If this powder is pressed and the density is increased to about 5.0 g/cm$^3$ (the density ratio in this condition is about 60%), the pressed powder is barely formed into a mass that can be easily broken by simply touching it with a finger. If another portion of the iron powder is mounted on this mass and further pressed in the die, these portions will join with each other into a whole mass. When this is done, no boundary between the two portions can be found. In contrast, if the first portion of the iron powder is compressed into a mass with a density of about 6.0 g/cm$^3$ (the density ratio in this case is about 70% to 75%) or more, and if the second portion is charged on such a mass and compressed together, these portions will not join with each other. Instead, a boundary surface will form between the two portions allowing them to be easily separated from each other.

In this connection, in the manufacture of ordinary machine parts, the powdered material is generally compressed into a mass with a density ratio of 75% or more. Therefore, it is difficult to integrally form the separately charged powder portions into a whole continuous mass by the extrusion method described above.

In the present invention, the above-described extrusion method has been further improved, making it possible to overcome the limitation due to the reach of the punch and to manufacture a longitudinal pellet. Moreover, the present invention also makes it possible to continuously form the powdered material into a compacted body.

Specifically, the extrusion method of the present invention with the above-described improvement is characterized in that the powdered material under pressure of the punch is subjected to a breaking means prior to the real compression which is achieved at the constriction passage. Namely, the top end surface of the semicompacted powder is broken before it enters the constriction passage. By doing so, the powder particles of the semicompacted powder and the powder newly added can be joined together in the constriction passage, and the former and latter portions of the charged powdered material can be integrally formed into a continuous body. Accordingly, it becomes possible to obtain a desired length for the compacted body by repeating the steps of charging the powder in the die cavity and pressing the charged powder by the punch for a predetermined number of cycles.

As a results, according to the extrusion method of the present invention, it becomes possible to manufacture a compacted body having a density ratio of about 75% or more, while being extended to any desired length.

Referring now to the drawings, preferred embodiments of the extrusion method for a powdered material and the extruding apparatus for accomplishing the extrusion method according to the present invention will be explained.

Figure 2:
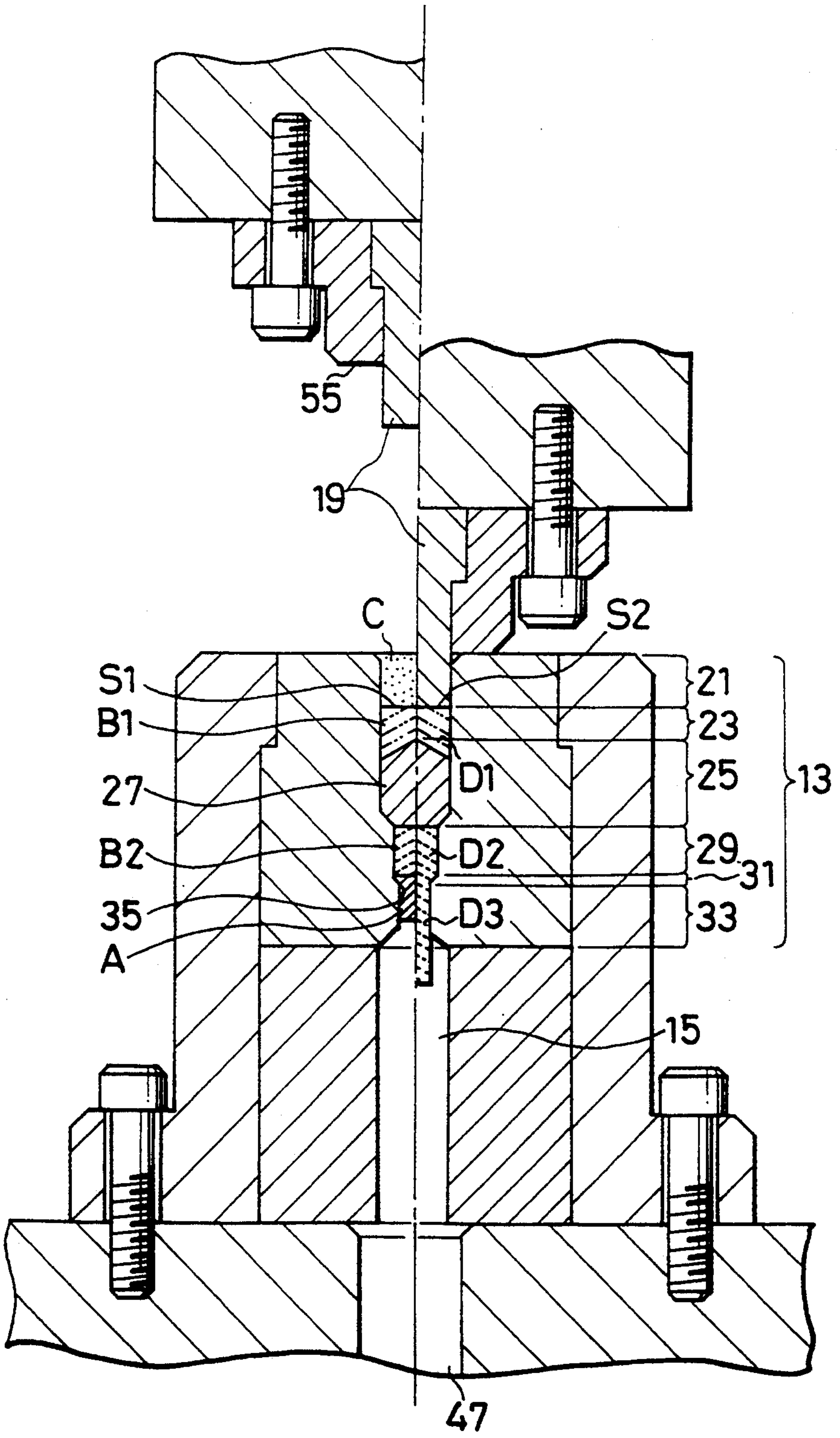
FIG. 2 is a vertical sectional view showing the left and right portions for explaining the operation of the apparatus of FIG. 1.
Figure 3:
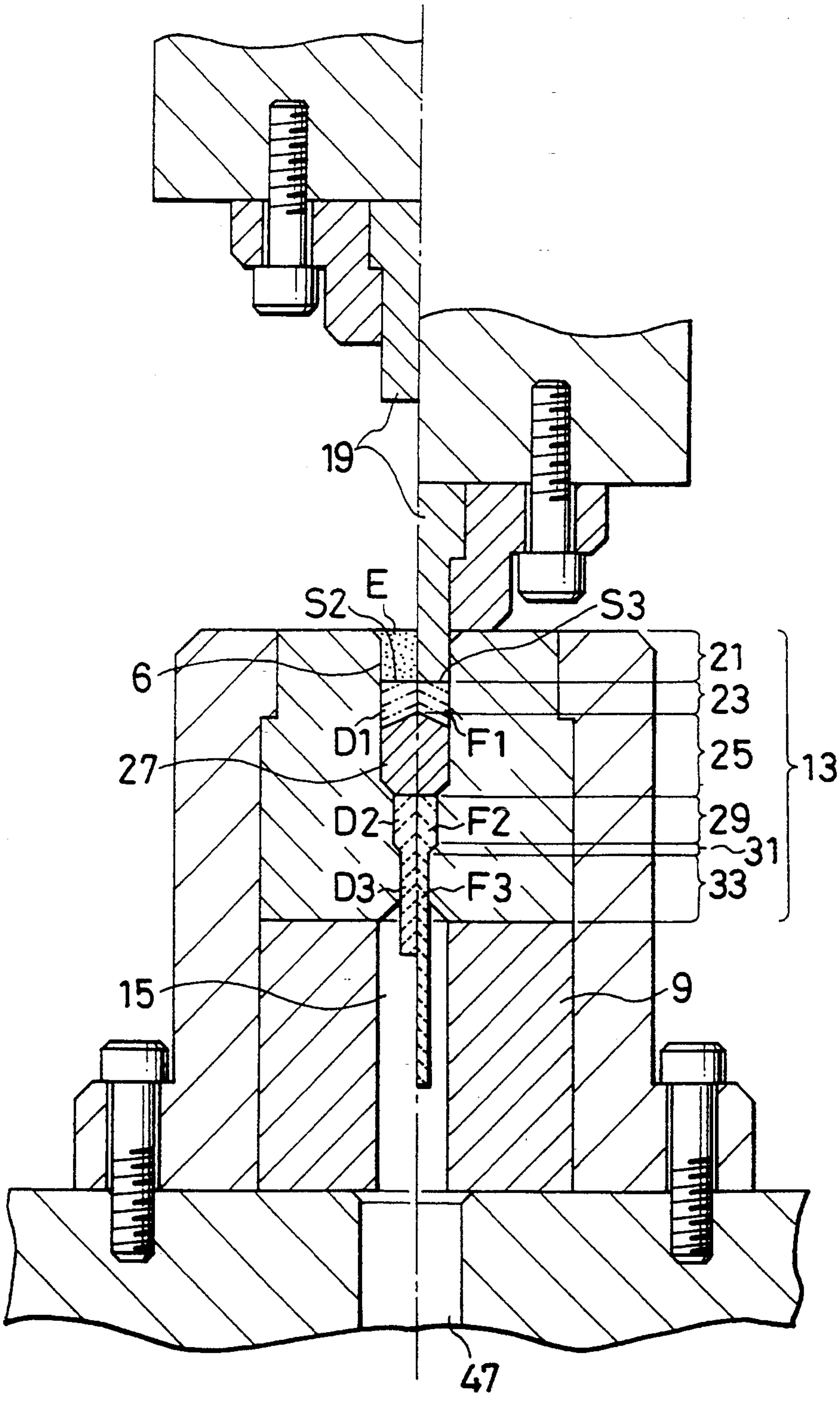
FIG. 3 is a vertical sectional view showing the left and right portions for explaining the operation subsequent to the operation illustrated in FIG. 2.
Figure 4:
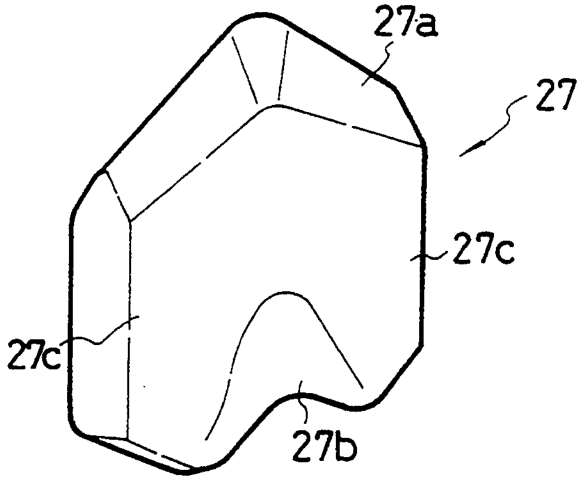
FIG. 4 is a perspective view of a core piece used as a breaking means,in the first embodiment of the extrusion apparatus shown in FIG. 1.
Figure 5:
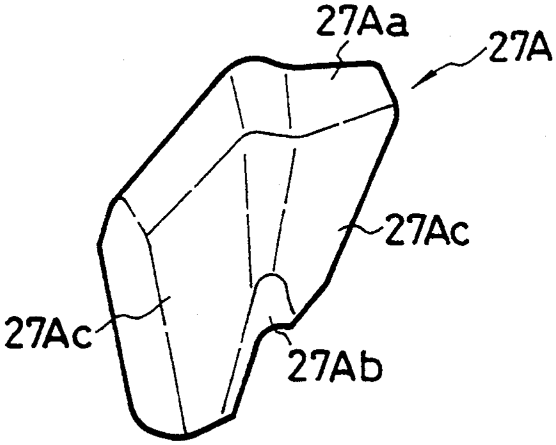
FIG. 5 is a perspective view of another core piece used in the first embodiment of the extrusion apparatus.

FIGS. 1 through 4 show a first embodiment of the apparatus for accomplishing the extrusion method according to the present invention. FIG. 1 is a vertical sectional view of the extrusion apparatus, and FIGS. 2 and 3 are views for explaining an extrusion operation with the extrusion apparatus of FIG. 1. FIGS. 4 through 6 show examples of breaking means used in the first embodiment of the extrusion apparatus. In this embodiment, a compacted body as shown in FIG. 7 can be preferably obtained.

Referring to FIG. 1, an extrusion apparatus 1 comprises a die assembly 3 and a punch assembly 5.

The die assembly 3 includes a cylindrical die 7, a cylindrical die block 9 and a tubular die holder 11. The die 7 having a die cavity 13 is an essential part of the die assembly 3, and the die 7 is mounted on the die block 9. The die block has a discharge passage 15 which communicates with the die cavity 13, and through which compacted powder is extruded. The die holder 11 holds the die 7 and the die block 9 to fix them on a lower hard plate 17. The punch assembly 5 has a punch 19 which is slidably inserted into the die cavity 13.

The die cavity 13 vertically penetrates the die 7 along the central axis of the die 7, and includes a cylindrical charge portion 21, a preliminary compression portion 23, a breakage portion 25 on which a core piece 27 is arranged, a spacing portion 29, a constrictor portion 31, and a nozzle portion 33. These six portions are coaxially aligned to the die 7, in order from top to bottom.

The charge portion 21 is defined as a space which the punch 19 can reach when inserted in the die cavity 13. In other words, the charge portion 21 lies between the top inlet of the die cavity 13 and the level at which the bottom end of the cylindrical punch 19 reaches when the punch assembly 5 is lowered to a preset lowest position, and is surrounded by the upper bore surface of the die cavity 13.

In contrast, the preliminary compression portion 23 is a portion which is located between the charge portion 21 and the breakage portion 25, and is formed into a cylindrical shape having the same diameter as that of the charge portion 21.

Thus, if the powdered material is filled in the die cavity 13 and pressed by the punch 19, the powdered material on the charge portion 21 will be pushed into the preliminary compression portion 23 and be changed into a semicompacted condition with light compression. This will form a circular top surface on the semicompacted body formed at the boundary of the charge portion 21 and the preliminary compression portion 23.

The upper part of the breakage portion 25 has the same diameter as that of the charge portion 21 and the preliminary compression portion 23, with a stepped portion 25*a* having an inclined surface of a truncated-cone shape being provided at the lower end of the breakage portion 25.

As shown in FIG. 4, the core piece 27, on the whole, is formed into a thin shape like a pair of wings, and the upper portion 27*a* of the core piece 27 is formed like a chevron with the top portion being tapered. The lower portion 27*b* of the core piece 27 is gradually thinned down, with the central bottom portion being the thinnest portion.

The widest lateral width of the wing-like portions 27*c* is regulated so that, when the core piece 27 is placed on the breakage portion 25, both side ends of the widest portion of the core piece 27 fittingly contact the bore surface of the die cavity 13. Upon fitting, the core piece 27 stands longitudinally on the inclined surface of the stepped portion 25*a*, and crosses the die cavity 13 in the diametrical direction so that the die cavity 13 is vertically separated into two half sections at the breakage portion 25 by the core piece 27.

According to the above construction, the semicompacted powder pushed out from the preliminary compression portion 23 is separated into two portions by the top edge of the core piece 27, which are then distorted and cracked in the breakage portion. As a result, the top surface of the semicompacted powder is broken, so that the formerly charged portion and the latter charged portion of the powdered material can be joined. The broken portion of the powdered material is then pushed into the cylindrical spacing portion 29 which is disposed below the stepped portion 25*a*. At the spacing portion 29, the above-described two portions of the powdered material are joined together.

Disposed under the spacing portion 29 is the constriction portion 31 which is formed in a truncated cone shape, thereby tapering the die cavity 13 at the constriction portion 31. Namely, the cross-sectional dimension of the die cavity 13 is gradually reduced at the constriction passage to a size that is approximately as large as the cross-sectional dimension of a desired compacted product, though it should be noted that the volume of the extruded powdered material is small and radially expands at the outlet of the nozzle portion 33 due to a spring-back force of the compressed powdered material. Moreover, the terminal of the constriction portion 31, or an extrusion port 35, is coaxially connected with the cylindrical nozzle portion 33 having the same diameter as that of the extrusion port 35, so that the same cross-sectional dimension is maintained for a predetermined distance at the nozzle portion 33.

Figure 7A:
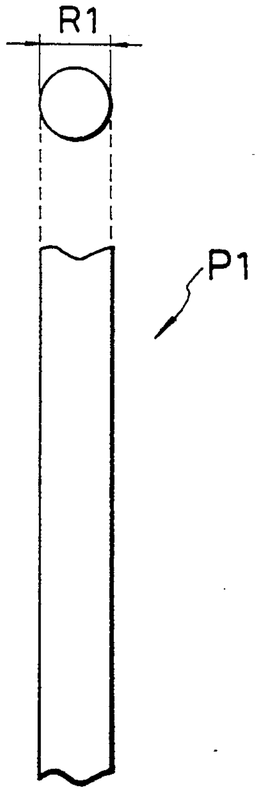
FIGS. 7*a* and 7*b* are illustrations of exemplary products which can be manufactured by the extrusion apparatus of FIG. 1.

More specifically, if a product P1 such as shown in FIG. 7*a* is to be made, the diameter of the extrusion port 35 and the nozzle portion 33 are approximately equal to R1.

Figure 7B:
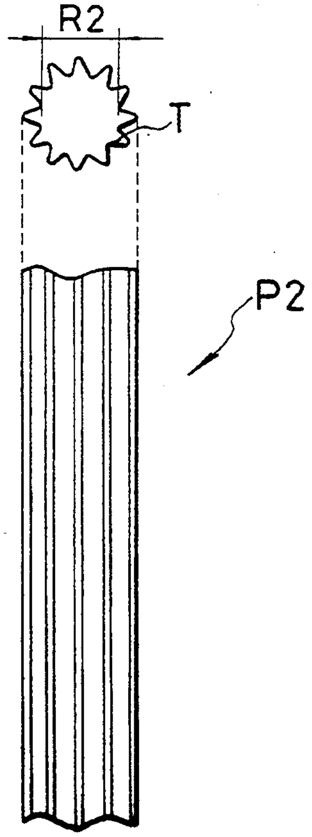

On the other hand, if the goal is to make a product such as P2 having teeth T longitudinally extending on its outer periphery, as shown in FIG. 7*b*, the diameter of the extrusion port 35 should approximately correspond to the diameter R2 of the central shaft portion of the product P2, with grooves having the same corresponding measurements as those of the teeth being formed in the bore surface of the nozzle portion 33. The grooves are preferably extended to the inclined bore surface of the constriction portion 31 so that the shape of the lateral sections formed for the constriction portion 31 is in similar to that of the product P2.

In the above-described construction, the preliminary compression portion 23 may be omitted.

At the lower end portion of the die 7, the nozzle portion 33 is enlarged and connected to a cylindrical discharge passage 15 which axially penetrates the die block 9. Moreover, the outer peripheral top portion of the die 7 is formed into a stepped portion 39 of reduced diameter. At the top of the die holder 11, a rim portion 41 which protrudes radially and inwardly is integrally provided for receiving the stepped portion 39 of the die 7, when the die 7 is inserted into a cylindrical inner bore of the die holder 11. The die 7 and the die block 9 are coaxially arranged inside the die holder 11 to assemble the die assembly 3.

Moreover, a flange 48 is integrally formed on the outer periphery of the lower end portion of the die holder 11 for fixedly mounting the die assembly 3 with bolts 45 on the lower hard plate 17 of the extruding apparatus 1. The lower hard plate 17 has an extension hole 47 having a diameter larger than that of the discharge passage 15. The extension hole 47 vertically penetrates the lower hard plate 17, and coaxially connects with the die cavity 13 and the discharge passage 15, when the die assembly 3 is mounted on the lower hard plate 11.

Further, the punch assembly 5 comprises a punch 19 with a diameter approximately the same as that of the charge portion 21 of the die cavity 13, so that the punch 19 can be fittedly inserted into the charge portion 21. The upper base portion of the punch 19 is slightly enlarged. The punch 19 is passed through a central hole 49*a* of a stopper ring 49, and the stopper ring 49 is secured to an upper hard plate 51 with bolts 53 in such a manner that the punch 19 firmly stands on the upper hard plate 51 and protrudes downwards from the central hole 49*a*.

The upper hard plate 51 is connected to a drive source such as an hydraulic press and the like so that the upper hard plate 53 can be vertically raised and lowered. The punch assembly 5 is controlled so that, when the punch assembly 5 is elevated to a preset highest position, the position of the punch assembly 5 can be maintained for a predetermined time. Moreover, operation of the punch assembly 5 is regulated so that the lowest position of the punch 19 is adjusted to coincide with a position at which the lower flat surface 55 of the stopper ring 49 abuts the top surface of the die 7, as shown in the right-half portion of FIG. 2. At this position, the length of the punch 47 is regulated so that the punch 19 does not abut the core piece 27.

Next, referring to FIGS. 1 through 3, the operation of the extruding apparatus 1, in which powdered material is formed into a cylindrical product P1 as shown in FIG. 7*a*, will be described below.

First, after setting up the die assembly 3, a preparatory step is carried out. Namely, a stopper piece is placed in the vicinity of the constriction portion 31 or nozzle portion 33 so that the powdered material may be temporarily received in the die cavity 13. Any deformable or flexible material can be utilized as a material for the stopper piece. For example, a soft solid piece made of a soft metal such as lead and the like; paraffin wax and the like; an elastic rubber; a cellular material such as polyurethane foam, sponge and the like; a flexibly sheeted material such as paper, cloth and the like; and a fibrous filler such as glass fiber, cotton fiber and the like can be utilized. The flexible material as mentioned above is placed in the vicinity of the constriction passage 21 of the die cavity 13 so as to close the die cavity 13, and more preferably, a soft solid such as lead is utilized to sufficiently fill the constriction passage 21. Another example of a material for the stopper piece is a powder pellet which is compressed into a cylindrical shape with the same diameter as that of the nozzle portion 33. In this case, the powder pellet is fittedly inserted in the nozzle portion 3 to close the die cavity 13.

Next, the core piece 27 is fitted in the breakage portion 25 of the die cavity 13, and the die block 9 and the die 7 with the stopper piece and the core piece 27 are inserted in the die holder 11. After the above-described preparations, initial operation of the extrusion process is carried out.

In the initial operation, the powdered material is charged in the die cavity 13, and the die cavity 13 is filled while the position of the punch assembly 5 is maintained axially above the die cavity 13. Next, the charged powder is pressed by the punch 19 against the stopper piece, and then the punch 19 is elevated again. As a result of this operation, the powdered material is compressed and semicompacted, with the charge portion 21 emptied. Then, more powdered material is again added to the charge portion 21 of the die cavity 13.

In accordance with the above-described initial operation, the extrusion apparatus 1 is now primed for normal extrusion. This condition is illustrated in the left half of FIG. 2, in which the portion A is the stopper piece in this state, the portions B1 and B2 correspond to the semicompacted powder, and the portion C corresponds to the powder newly supplied in the charge portion 21. It is to be noted that it may sometimes be necessary, for proper priming of the extrusion apparatus 1, to repeat the initial operation one or more times in accordance with powder conditions such as bulk density, particle size and the like, and in accordance with design of the apparatus, such as the ratio of the volume of the charge portion 21 relative to that of the whole die cavity 13, the size of the core piece 27 and the like.

For normal extrusion, the punch 19 is lowered again to press the powdered material. By this operation, the additional powder C in the charge portion 21 is pressed into the preliminary compression portion 23 and semicompacted, which corresponds to the portion D1 of the right half of FIG. 2. This semicompacted portion D1 forms another top end surface S2 shown in the right half of FIG. 2. At the same time, the former end surface S1 of the semicompacted powder B2 in the left half of FIG. 2 is forced into the breakage portion 25, where it is broken by the top edge of the core piece 27. Thus, it becomes possible to bind the portion C and the portion B1 of the left half of FIG. 2 by the pressing operation, with the end surface S1 passed through the breakage portion 25. Moreover, the separated and cracked portion of the powdered material passing the core piece 27 moves into the spacing portion 29 and is united together, which corresponds to the portion D2 in the right half of FIG. 2. Moreover, the portion B2 of the powdered material in the left half of FIG. 2 is pushed down from the spacing portion 29 and becomes radially compressed at the constriction portion 31. The lower part of the powder portion B2 is extruded through the nozzle portion 33. On this extrusion, the powdered material has been completely compacted. This completely compacted portion is illustrated as the portion D3 in the right half of FIG. 2. By this step, the stopper piece A in the left half of FIG. 2 has been pushed out of the nozzle portion 33, and falls through the discharge passage 37 and the extension hole 47.

After the above operation, the punch 19 is elevated again, thereby vacating the charge portion 21. Then, additional powdered material is supplied into the die cavity 13.

Next, referring to the left half of FIG. 3, the charge of powdered material is further repeated. In this state, the charged powder corresponds to the portion E in the left half of FIG. 3. Then, the punch 19 is lowered again to press the powdered material. By this operation, the added powder E is similarly semicompacted, which corresponds to the portion F1 of the right half of FIG. 3. This semicompacted portion F1 forms a third top end surface S3 shown in the right half of FIG. 3. At the same time, the end surface S2 in the left half of FIG. 3 is forced into the breakage portion 25, where it is broken by the core piece 27. The broken portion of the powdered material moves into the spacing portion 29, which is illustrated as the portion F2 in the right half of FIG. 3. Moreover, the portion D2 of the powdered material in the left half of FIG. 3 is pushed down from the spacing portion 29, and becomes radially compressed at the constriction portion 31.

The lower part of the portion D2 is completely compacted and extruded through the nozzle portion 33. The completely compacted portion at this time continues with the former compacted portion D3, and extends to the outside of the apparatus 1 through the discharge passage and the extension hole 47, as illustrated as the portion F3 in the right half of FIG. 3. The above-described phenomena occur almost simultaneously.

As clearly understood from the above description, the compacted body is, longitudinally extended by repeating the cycle of charging of the powdered material and pressing by the punch 19, with the total longitudinal length of the compacted body being substantially in proportion to the number of times this cycle is repeated. Therefore, the number of repetitions is set in accordance with the desired length of the compacted product.

After the repetitions of the above operation cycle for the first product are accomplished, a piece of soft solid material such as paraffin wax and the like is placed on the terminal powder portion for the first product piece in the die cavity 13 and pressed. After this step, the cycle of charging and pressing is repeated again. As a result of this operation, the piece of soft solid interposes between the terminal powder portion for the first product and the initial powder portion for the second product, thereby preventing these portions from being Joined together. In this way, the first product is terminated and separated from the second product. More practically, the continuously compacted body of the powdered material can be cut by a cutting device to obtain an elongated compact piece of desired length.

FIG. 5 shows a modification of the core piece. In this core piece 27A, both side portions 27A*c*, each of which is formed like a wing, are twisted and inclined with respect to the central axis of the core piece 27A. According to this structure, the semicompacted powder can be easily broken against the inclined surface of the wing-like portions 27A*c*. The bottom end 27A*b* is thinned, similarly.

Figure 6A:
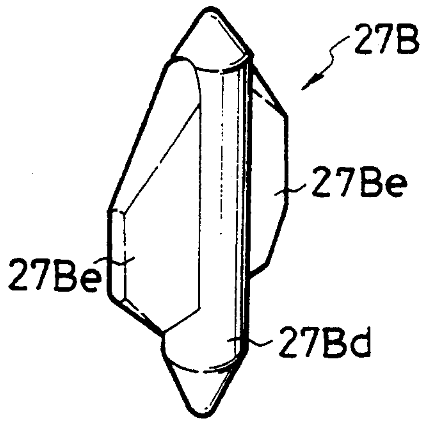
FIGS. 6*a* and 6*b* are perspective views of another core piece.
Figure 6B:
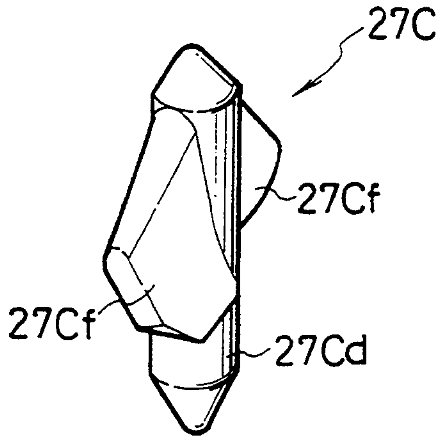

FIGS. 6*a* and 6*b* show other modifications of the core piece 27. In FIG. 6*a*, the core piece 27B has a pair of wing-like portions 27B*e* integrally formed on an axial core rod 27B*d* with both ends being pointed. The core piece 27B is arranged in the die cavity 13 so that the axis of the core rod 27B*d* corresponds to the axis of the die cavity 13. In this modification, the core rod 27B*d* protrudes downwards, with the lower tip being positioned lower than the level of the wing-like portions 27B*e*. This structure results in a smoother and more regular introduction of the broken portion of the powdered material into the spacing portion 29 of the die cavity 13.

The core piece 27C of FIG. 6*b* is further modified to have wing-like portions 27C*f* twisted with respect to the axial core rod 27C*d* in the same manner as that of FIG. 5. Therefore, this modification is advantageous in that it allows for efficient breakage of the semicompacted powder and regular introduction of the broken portion.

Of course, the number of the wing-like portions 27*c*, i.e., 27A*c*, 27B*e* and 27C*f*, can be increased to three or more.

Figure 8:
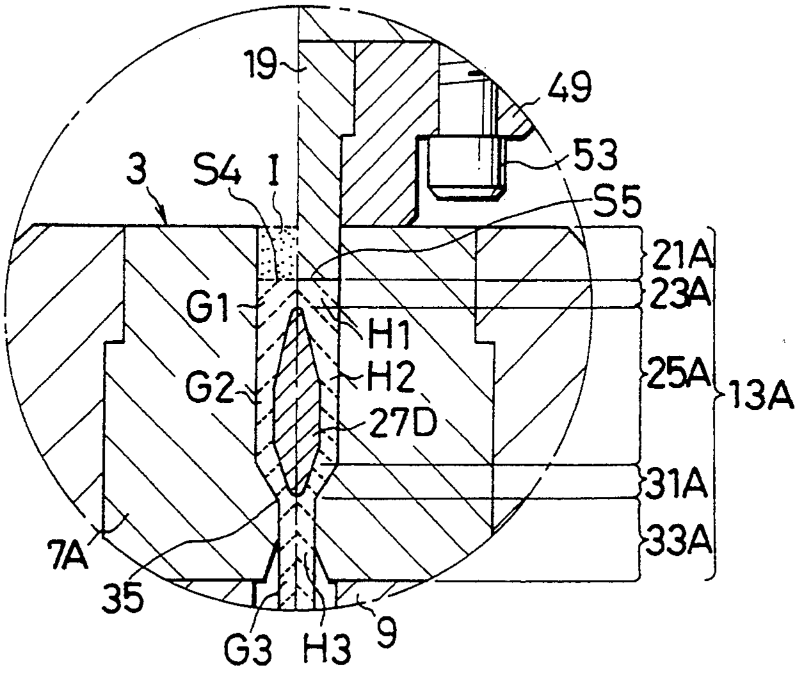
FIG. 8 is a vertical sectional view of an essential part of the extrusion apparatus according to the present invention for explaining the modification of the core piece.
Figure 9:
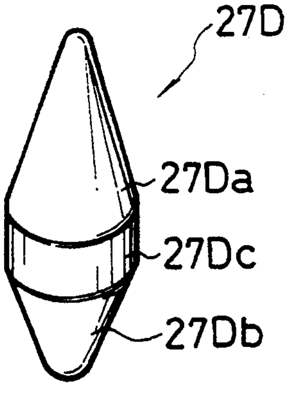
FIG. 9 is a perspective view of the core piece of FIG. 8.

FIG. 8 shows a modification of the first embodiment, and illustrates a main portion of the die assembly 3 with the core piece 27D illustrated in FIG. 9.

In this modification, the core piece 27D is supported by rebound pressure produced at the constriction portion 31A of the die cavity 13A, which allows the core piece 27 to float in the powdered material.

Specifically, the core piece 27D applied to the die 7A comprises a conical top portion 27D*a*, a conical bottom portion 27D*b*, and a cylindrical center portion 27D*c*. The cross-sectional dimension of the center portion 27D*c* is smaller than the cross-sectional dimension of the breakage portion 25A of the die cavity 13A, and the height of the top portion 27D*a* is larger than that of the bottom portion 27D*b*. Moreover, the breakage portion 25A of the die cavity 13A has no stepped portion for supporting the core piece 27D, and the spacing portion is omitted.

According to the above construction, the initial operation as described for the first embodiment is similarly carried out. However, during the initial operation the,-core, piece 27D is coaxially positioned on the constriction portion 31A, as shown in FIG. 8, while the powdered material is charged in the die cavity 13A. This state of the die assembly 13A is shown in the left half of FIG. 8, in which the core piece 27D is held in place by the powdered material. Then, when the punch 19 is pushed into the die cavity 13A, the charged powder I in the left half of FIG. 8 is pushed into the preliminary compression portion 23A and forms a semicompacted portion H1 shown in the right half of FIG. 8. At the same time, the semicompacted portion G1 in the left half of FIG. 8 is forced to pass through the breakage portion 25A between the bore surface of the die cavity 13A and the core piece 27D, which corresponds to the portion H2 in right half of FIG. 8, resulting in the end surface S4 being broken by the core piece 27D. The broken portion G2 of the left half of FIG. 8 is thereby pushed into the constriction portion 31A and becomes compressed into the completely compacted body which is illustrated as the portion H3 in the right half of FIG. 8. Thus, the extension of the compacted body G3 is achieved.

At the constriction portion 31A, rebound force is produced by the powder being radially pressed towards the axis of the die cavity 13A by the conical bore surface of the constriction portion 31A, and this force acts so as to push up on the bottom of the core piece 27D. As a result, the core piece 27D is floated in the powdered material and the position of the core piece 27D is maintained.

Of course, the above-described modification is applicable for manufacturing either of the types of products P1 and P2 of FIGS. 7*a* and 7*b*.

Figure 10:
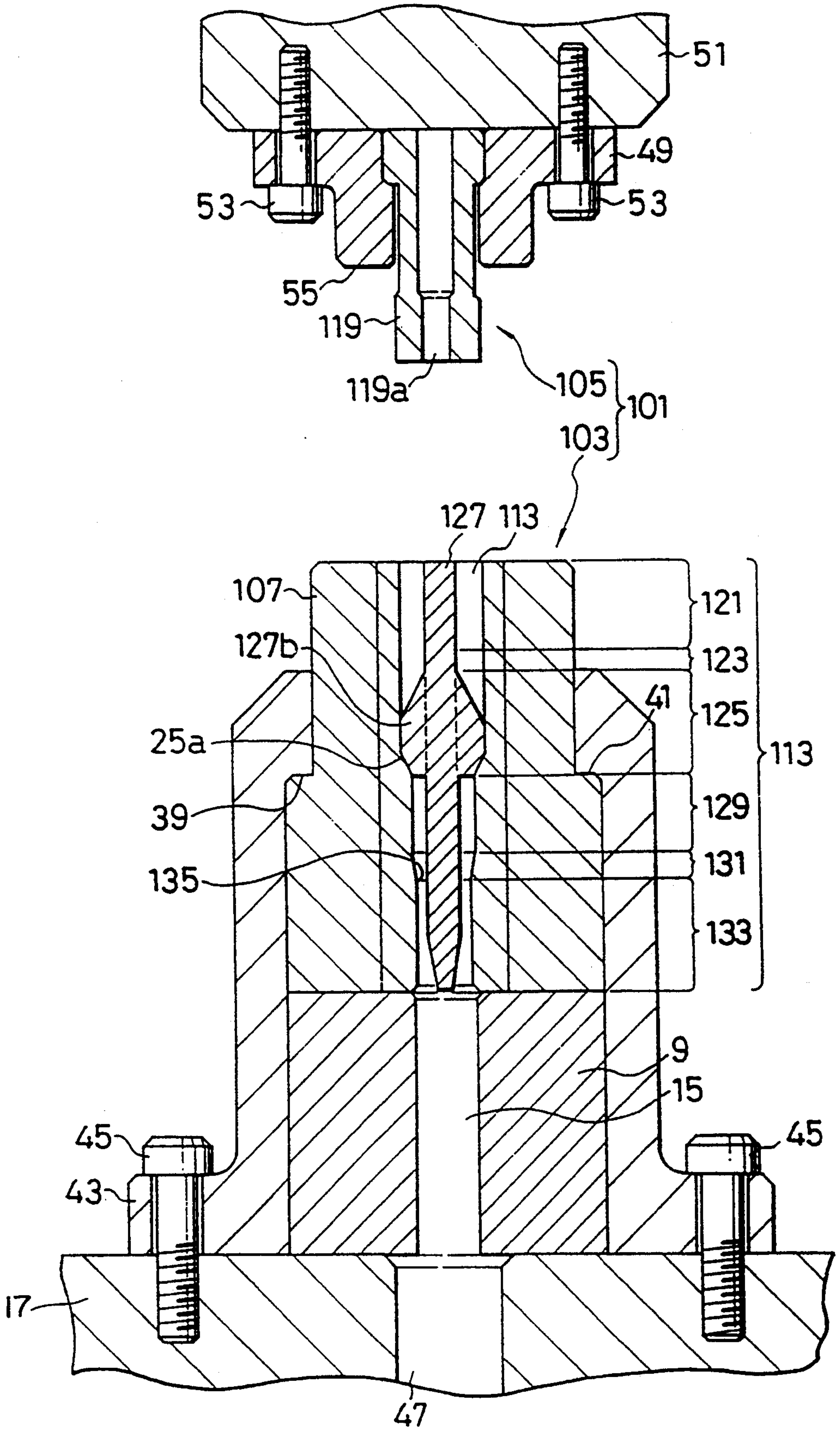
FIG. 10 is a vertical sectional view showing a second embodiment of the extrusion apparatus according to the present invention.
Figure 11:
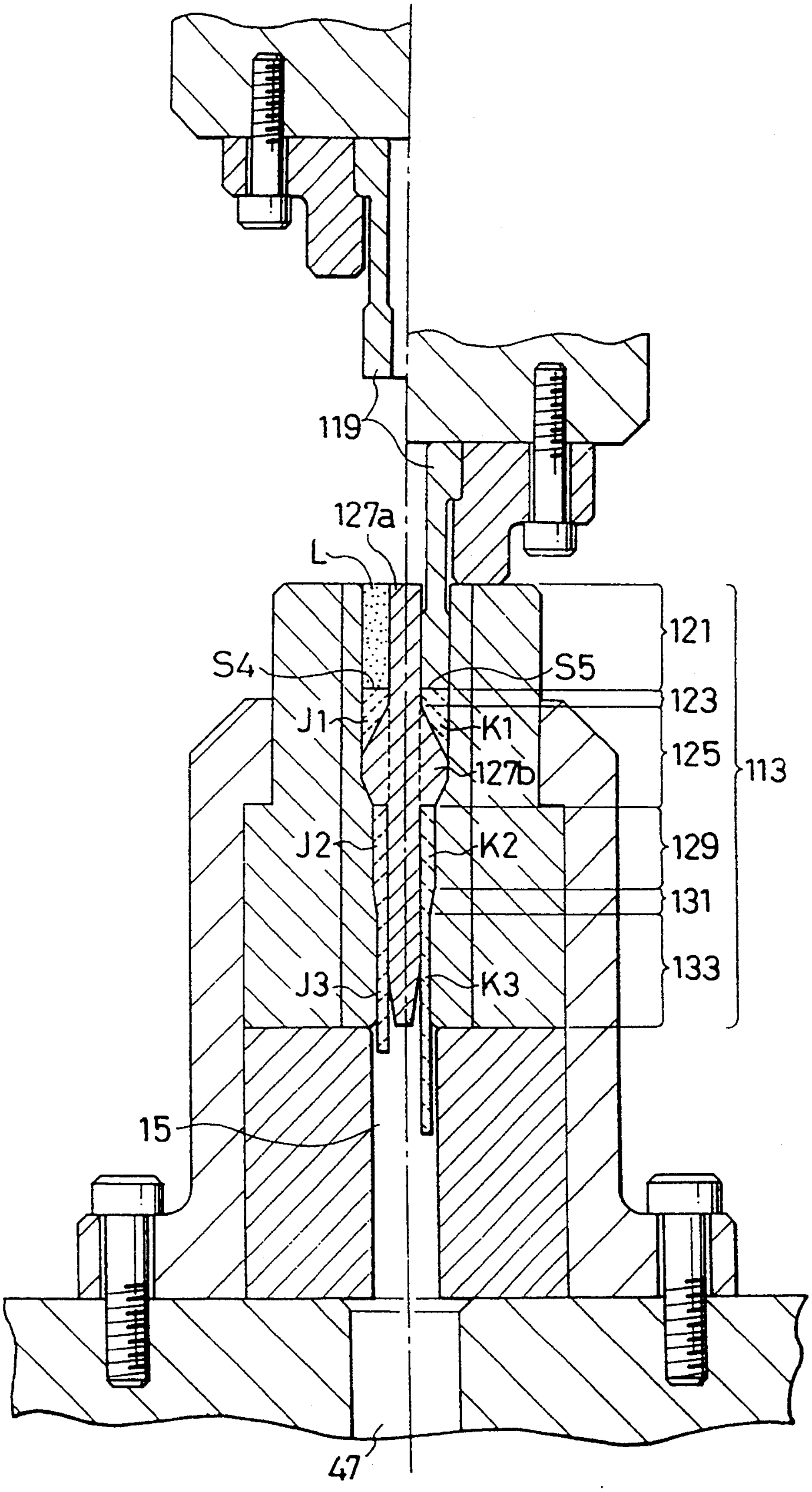
FIG. 11 is a vertical sectional view of the left and right portions of a second embodiment of the extrusion apparatus according to the present invention for explaining the operation of the apparatus.
Figure 13A:
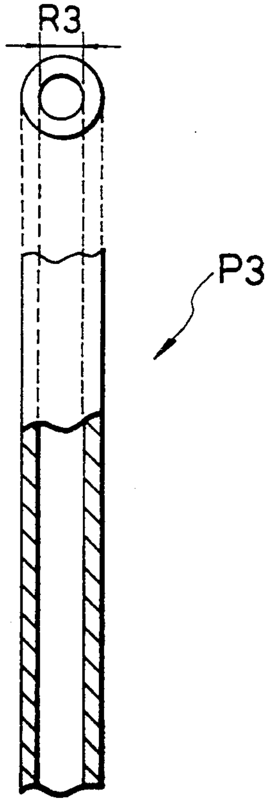
FIGS. 13*a* and 13*b* are illustrations of exemplary products which can be manufactured by the extrusion apparatus of FIG. 11.

FIGS. 10 and 11 show a second embodiment of the present invention. This embodiment shows an example of a basic construction that enables the manufacture of a tubular product having an axial hole. For example, the products P3 and P4 shown in FIGS. 13*a* and 13*b*.

Figure 12:
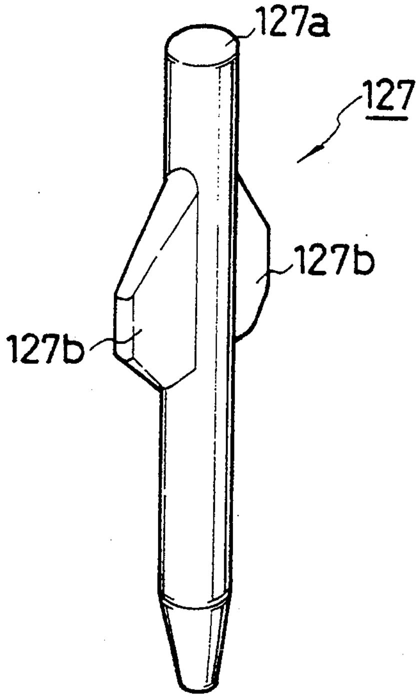
FIG. 12 is a perspective view of a core piece used in the extrusion apparatus of FIG. 11.

FIG. 10 shows a vertical section of an apparatus 101 according to the second embodiment, and FIG. 11 is an illustration for explaining the operation for the second embodiment. FIG. 12 shows a core piece 127 used in the second embodiment. In the drawings and following description, similar parts are designated by reference numerals like those used for the first embodiment and will not be given further description.

To achieve the manufacture of a tubular product by using the extrusion apparatus 101, the core piece 127 and the punch 119 of the second embodiment are improved to change the cross-sectional shape of the charge portion 121, the preliminary compression pass 123, the constriction portion 131, etc. into a ring shape.

Specifically, as shown in FIG. 12, the core piece 127 comprises an axially extending core rod 127*a* and a pair of wing-like portions 127*b* integrally formed on the core rod 127*a*. By assembling the die assembly 103 as shown in FIG. 10, the core rod 127*a* acts as a mandrel and has a diameter of approximately the same size as the diameter R3 of the axial hole of the product P3 or P4, with reference to FIGS. 13*a* and 13*b*. Only the lower tip portion of the core rod 127*a* is tapered. The longitudinal length of the core piece 127 is substantially equal to that of the die cavity 113, and the axis of the core piece 127 corresponds to the axis of the die cavity 113 when the core piece 127 is fitted in the die cavity 113.

The pair of wing-like portions 127*b* act as the breaking means and has a lateral width corresponding to the diameter of the breakage portion 125 at the widest portion thereof. The breakage portion 125 has a stepped portion 25*a* at its lower end so that, when the core piece 127 is inserted in the die cavity 113, the wing-like portions 127 are stopped by the stepped portion 25*a* and become located between the preliminary compression portion 123 and the spacing portion 129, being spaced from the constriction portion 131 by the spacing portion 129. The wing-like portions 127*b* work to break the semicompacted powder being pushed downwards into the breakage portion 125, thus resulting in the broken portion of the powder being forced into the spacing portion 25*a*.

The charge portion 121 of the die cavity 113 into which the powdered material is successively charged is similarly defined as the space between the top of the die cavity 113 and the plane defining the top end surface of the powder semicompacted by the punch 119, as can be understood from FIG. 11. Since the upper end of the core rod 127*a* extends into the charge portion 121, the charge portion 121 occupies a tubular space whose outer periphery is defined by the upper part of the bore surface of the die cavity 113, and whose inner periphery is bounded by the outer curved surface of the core rod 127*a*.

The preliminary compression portion 123 is defined as the space lying between the level to which the bottom surface of the punch 119 is lowered and the level to which the wing-like portions 127*b* extend, and has a tubular shape, similarly.

Figure 13B:
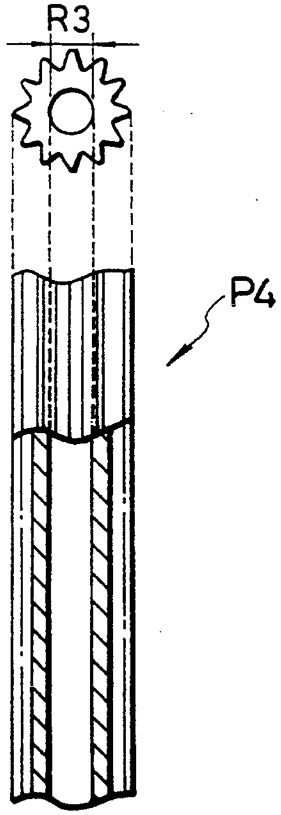

Below the spacing portion 129, the constriction portion 131 is tapered so that the cross-sectional shape and dimension of the extrusion port correspond to those of the product to be manufactured. In FIGS. 10 and 11, the die cavity 113 is illustrated for the manufacture of the tubular product P3 of FIG. 13*a*, and the extrusion port 135 has substantially the same shape and the same dimension as those of the cross section of the product P3. If a gear-formed product, such as the product P4 shown in FIG. 13*b* is the goal, grooves are formed in the bore surfaces of the constriction portion 131 and the nozzle portion 133 so that the cross-sectional shape of the constriction portion 131 is similar to the cross-section of the product. In so doing, the cross-sectional shape of the extrusion port 135 and the nozzle portion 133 will substantially correspond to that of the product.

As for the punch assembly 105, the punch 119 is formed into a tubular shape, with the cross-section of the bore 119*a* corresponding to that of the upper portion of the core rod 127*a*, so that the bore 119*a* can receive the core rod 127*a* when the punch 119 is inserted into the die cavity 113.

Operation for manufacturing the extrusion product P3 by using the extrusion apparatus 101 according to the second embodiment will be described below.

First, the preparatory step for fitting the stopper piece and the core piece 127, the initial operation for priming the apparatus 101 for normal extrusion, and a first cycle of pressing and charging operations are carried out for the extrusion apparatus 101 in a similar manner to the first embodiment. The resulting state of the above procedures is illustrated in the left portion of FIG. 11.

Then, the punch 119 is lowered and pressed into the charge portion 121, as shown in the right half of FIG. 11. By this operation, the charged powder L in the left half of FIG. 11 is pressed into the preliminary compression portion 123 and becomes compressed to form the tubularly semicompacted portion K1 in the right half of FIG. 11. At the same time, the previously semicompacted portion J1 with the top end surface S4 in the right half of FIG. 11 is broken by the wing-like portions 127*b* at the breakage portion 125 and is forced into the spacing portion 129, so as to form the broken portion K2 of the semicompacted powder shown in the right half of FIG. 11. In addition, the broken portion J2 of the left half of FIG. 11 is compressed at the constriction portion 131 and is extruded from the extrusion port 35 to the nozzle portion 133, thereby forming a completely compacted portion K3 in the right half of FIG. 11, which is Joined in a continuous way with the previously compacted portion J3 in the left half of FIG. 11. Then, when the punch 119 is elevated, the charging portion 121 is vacated.

After the above operation, the broken portions are subsequently compressed at the constriction portion 131 and continuously extruded by successively repeating the operation cycle of powder charge and pressing in a manner similar to that for the first embodiment. As a result, the length of the completely compacted product is elongated in accordance with the number of times the above operation cycle is repeated, with the elongated product being discharged out through the discharge passage 15 and extension hole 47.

As described above, it is possible to manufacture tubularly compacted products, such as the products P3, P4 and the like. In this connection, it is of course possible to appropriately control the length of the obtained product by regulating the number of times the operation cycle is repeated.

In the second embodiment, the upper part of the core rod 127*a* and the bore 119*a* of the punch 119 work in a way that prevents the axis of the core piece 127 from being shifted out of position during the pressing operation. However, it may be possible to omit these parts.

Moreover, in connection with the shape of the product, applicability of the present invention can be expanded by further modifying the extrusion apparatus. For example, it is also possible to manufacture a product with helical gears on its cylindrical outer surface. In either of the embodiments described above, this applicability can be accomplished by forming helical grooves in the bore surfaces of the constriction portion and the nozzle portion, and by employing rotation means in such a manner that the die and the punch can both rotate relative to the upper and lower hard plates with respect to the axis of the die cavity. Specifically, a bearing device such as a roller bearing and the like can be incorporated into each of the die assembly and the punch assembly. With regard to the die assembly, the die block can be separated into upper and lower sections, for example, with a ball bearing held therebetween. As for the punch assembly, the bearing device could be arranged between the punch and the upper hard plate. According to the above improvement, the punch and the die would be able to rotate with the core piece during the pressing operation, allowing the powdered material to be smoothly passed through the helical grooves by such motions.

Figure 14:
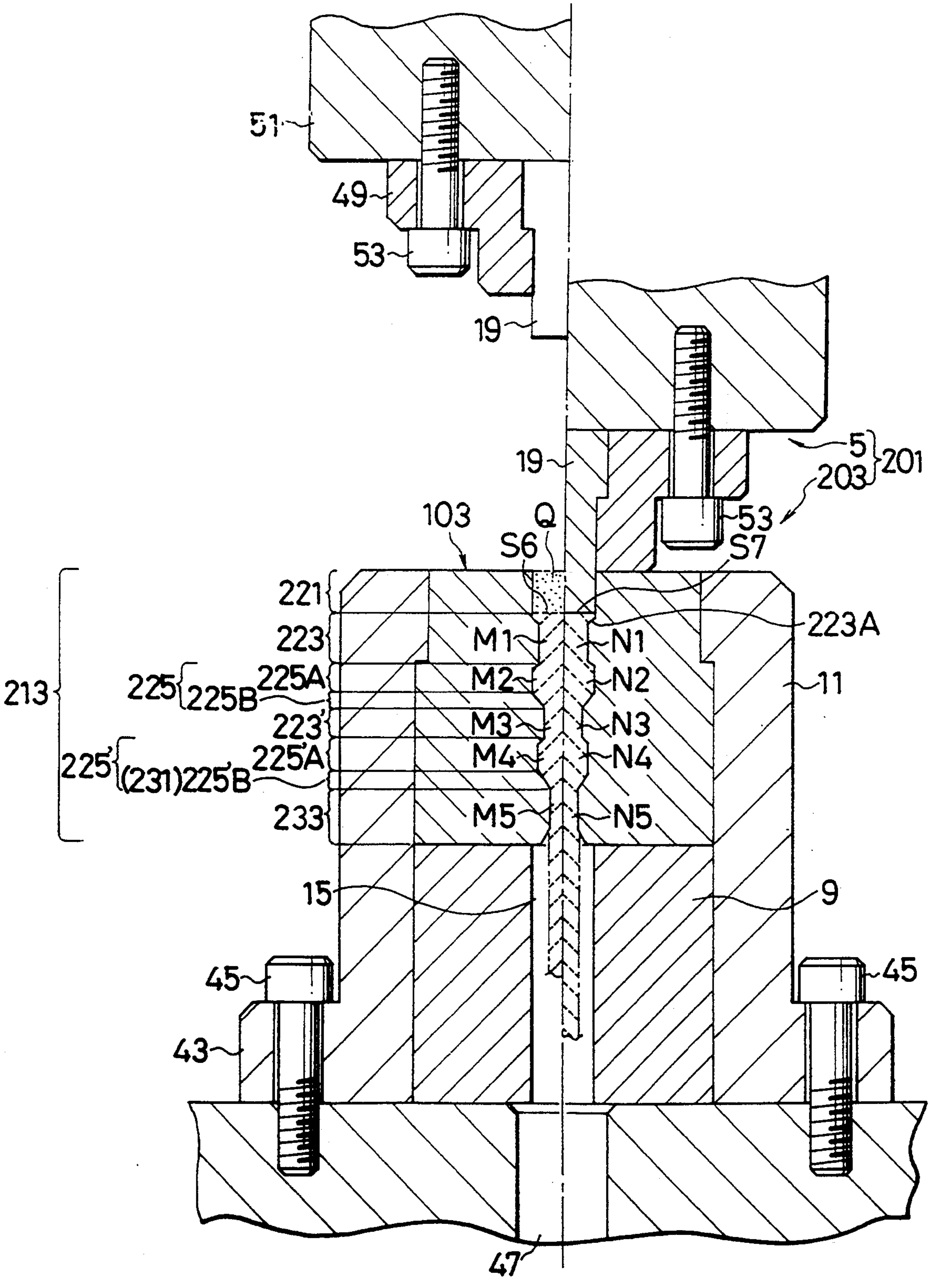
FIG. 14 is a vertical sectional view of the left and right portions of a third embodiment of the extrusion apparatus according to the present invention.
Figure 15:
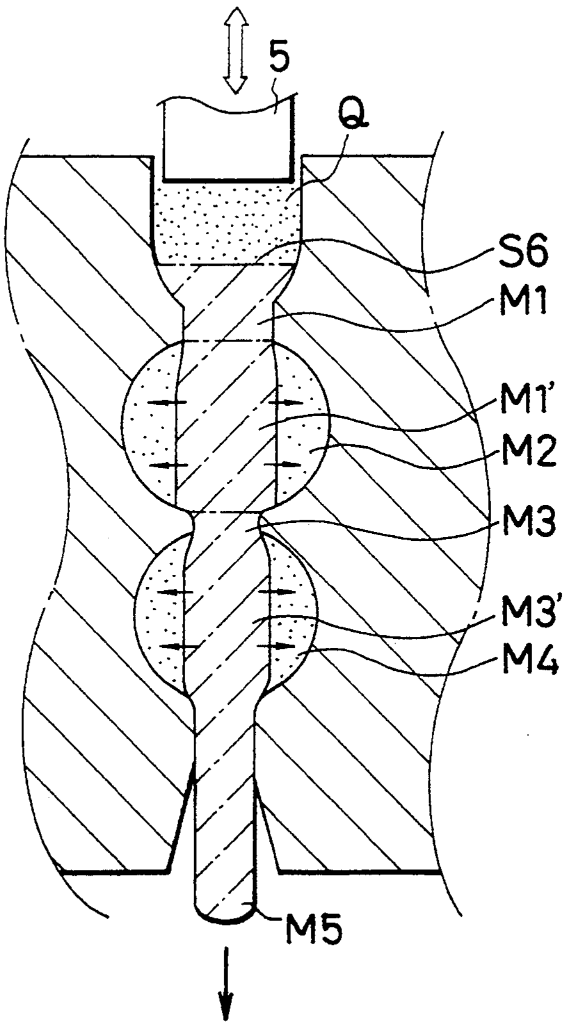
FIG. 15 is a vertical sectional view for explaining the operation of a typical die cavity employed for the extrusion apparatus of FIG. 14.

FIGS. 14 and 15 illustrate a third embodiment according to the present invention. In the third embodiment, a core piece is not utilized for the breaking means. Instead, the shape of the die cavity is improved so as to give rise to a breaking means.

FIG. 14 is an illustration for explaining the operation of the extrusion apparatus according to the third embodiment, in which the left half shows the die cavity charged with the powder material before being pressed by the punch, and the right half shows the die cavity after the punch is lowered. FIG. 15 shows the essence of a typical operation of the breaking means in the third embodiment. In the drawings and following description, similar parts are designated by reference numerals like those used for the first embodiment and will not be given further description.

The extrusion apparatus 201 of the third embodiment is quite different from that of the first embodiment with regards to the structure of the die cavity. Therefore, the structure of the die cavity 213 of the third embodiment will be described below.

Under a charge portion 221 of the die cavity 213 of the extrusion apparatus 201, a first preliminary compression portion 223, a first breakage portion 225, a second preliminary compression portion 223, a second breakage portion containing a constriction portion 231, and a nozzle portion 233 are aligned in order from top to bottom and are continuously formed.

The lower portion of the preliminary compression portion 223 is formed into a cylindrical shape in which the diameter is smaller than that of the charge portion 221, and the bore surface at the top portion of the preliminary compression portion 223 is formed into a conical surface, so as to decrease the diameter of the die cavity 213. As a result, the powdered material is lightly compressed through the preliminary compression portion 223 with the conical bore surface.

The first breakage portion 225 comprises a release portion 225A and a re-constriction portion 225B. In other words, the die cavity 213 is enlarged at the release portion 225A, and narrowed again at the re-constriction portion 225B by a conical bore surface. Here, it should be noted that the cross-sectional dimension of the bottom end of the re-constriction portion 225B is smaller than that of the cylindrical portion of the preliminary compression portion 223. In accordance with this structure, after the powdered material is preliminarily compressed into the semicompacted body M1 through the preliminary compression portion 223, a circumferential portion of the semicompacted body M1″ enters the release portion 225A and abuts the conical bore surface of the re-constriction portion 225B, as is typically illustrated in FIG. 15. At this time, since the die cavity 213 becomes enlarged at the release portion 225A, a space arises between the cylindrical side surface of the semicompacted body M1′ and the bore surface of the die cavity 213, thereby releasing the cylindrical side surface of M1′ from lateral or radial support by the bore surface of the die cavity 213. As a result, under the longitudinal pressure from the punch 19, the semicompacted body M1′ cracks and breaks into pieces, which radially scatter and fill in the breakage portion 225. Furthermore, the top end surface S6, which is formed at the boundary of the charge portion 221 and the preliminary compression portion 223 also breaks at the breakage portion 225, and this broken portion blends with the subsequent portion of the powdered material. The broken pieces of the semicompacted powder are compressed and rather tightly compacted again at the re-constriction portion 225B, and then this recompacted portion is forced into the second breakage portion 225′ through the second preliminary compression portion 223′.

The second breakage portion 225′ has a structure similar to that of the first breakage portion 225 and comprises a release portion 225′A and a re-constriction portion 225′B. As a result, after the powdered material is compressed again at the re-constriction portion 225B, it is cracked once more at the release portion 225′A. The cracked portion is then again tightly compressed at the re-constriction portion 225′B. The re-constriction portion 225′B of the second breakage portion 225 is the final place for constrictively compressing the powdered material in the die cavity 213. Accordingly, the re-constriction portion 225′B also acts as a constriction portion 231 corresponding to the constriction portion 31 of the first embodiment. Therefore, the cross-sectional dimension of the bottom end of the re-constriction portion 225B and the nozzle portion 233 are regulated to correspond to that of the product to be manufactured. In this embodiment shown in FIG. 14, a cylindrical product as shown in FIG. 7*a* is manufactured.

In operation, initially the die cavity 213, in which a stopper piece is placed, is filled with the powdered material and the punch 19 is applied to the die cavity 213. Then, powdered material is further charged into the die cavity 213 and is once more pressed by the punch 19. By this operation, the charged powder Q in the left half of FIG. 14 is compressed to form the semi-compacted portion N1 in the right half of FIG. 14. At this time, the previously charged and compressed portion M1 in the preliminary compression portion 223 is forced into the first breakage portion 225 and breaks into pieces N2. At the same time, cracked pieces M2 of the semicompacted body are compressed at the re-constriction portion 225B and pushed into the preliminary compression portion 223′ to form a semicompacted portion N3. Moreover, the semicompacted portion M3 in the left half of FIG. 14 is pushed into the second breakage portion 225′ and slightly cracked, which corresponds to the portion N4 in the right half of FIG. 14. The cracked portion M4 of the left half of FIG. 14 is finally compressed at the constriction portion 231 and discharged from the nozzle portion 233 to form a completely compacted body N5, which is continuous joined to the formerly compacted body M5.

In the third embodiment described above, the diameter size of the preliminary compression portion 223′ is smaller than that of the cylindrical portion of the preliminary compression portion 223, and larger than that of the nozzle portion 233. Accordingly, the density of the powdered material charged from the charge portion 221 rises, while passing through the die cavity 213.

Moreover, the difference between the diameters of the release portion 225′A and the preliminary compression portion 223′ is smaller than that between the diameter of the release portion 225A and the preliminary compression portion 223, with only a slight expansion being allowed at the second breakage portion 225′. Accordingly, only a small degree of breakage is expected to be caused at the second breakage portion 225′. Namely, the second breakage portion 225′ operates supplementary to the first breakage portion 225. It is also possible to eliminate the second release portion 225′A so that breakage is carried out only at the first breakage portion 225.

Moreover, the constriction by the conical surface at the upper portion of the preliminary compression portion 223 can be omitted, because it is possible to preliminarily compress the powdered material using only the cylindrical portion of the preliminary compression portion 223.

The above-described third embodiment of the present invention can be used for manufacturing not only a cylindrical compact, but also a compact having spiral gears by modifying the extrusion port and the nozzle portion 233 so that a spiraled recess is formed in the nozzle portion 233.

Now, the structure of the constriction portion used for the above-described embodiments will be described.

The powdered material is mainly compressed radially at the constriction portion, and the reduction of the volume of the powder material when it is pressed by the punch changes in accordance with the ratio of the diameter of the inlet of the constriction portion to that of the outlet. In other words, the compression ratio changes in accordance with the constriction ratio at the constriction portion. Therefore, the configuration of the die cavity can be designed by taking into consideration the bulk density of the powdered material and the desired density of the product to be manufactured, so that the extrusion port has substantially the same dimension as the cross-sectional dimension of a desired product, and so that the constriction portion of the die cavity has a suitable constriction ratio for the desired density. However, it should be noted here that the volume of the constricted powdered material is small and radially expands at the outlet of the discharge portion due to the spring-back force of the compressed powdered material.

When an area reduction ratio AR (%) is defined by the expression: $AR=(S-S')\times 100/S$, where S is the sectional area of the inlet of the constriction portion, and S′ is the sectional area of the outlet of the constriction portion or extrusion port, the area reduction ratio AR is preferably set to lie within a range of about 10% to about 15%. For example, when the raw powdered material to be used is an iron-containing powder and the area reduction ratio AR is about 13%, the obtained pellet has a density of about 7.1 $g/cm^3$, although this result may change somewhat depending on the operating speed of the punch. If the area reduction ratio exceeds 20%, extrusion becomes difficult.

Moreover, the inclination angle $\theta$ of the inclined conical bore surface of the constriction portion relative to the longitudinal direction of the die cavity is preferably selected to be less than or equal to 20°, and more preferably to be in the vicinity of 10°. If the inclination angle $\theta$ exceeds 20°, the pressure necessary for extrusion increases. In the case of using a powdered material containing elemental copper or elemental aluminum, the inclination angle may be set larger than the above-described range for iron-containing powder.

As clearly understood from the above description, the extrusion method according to the present invention can be performed by using a extrusion die having a simple structure, and accomplishes a simple compression operation applicable to various elongated shapes. Moreover, the present invention is suitable for continuously manufacturing elongated pieces. In addition, the compression ratio can be easily controlled by designing the die cavity in the manner explained above.

In the above-described embodiments, it is possible to change the length of the nozzle portion. If the pellet to be manufactured has no spiral portion, the nozzle portion may be omitted. However, in order to retain mechanical strength of the die at the portion forming the constriction passage and the extrusion port, the provision of an appropriate length of the nozzle portion on the die cavity is preferred.

The extrusion method of the present invention is suitable for compressing a metal powder in order to form compacted pellets that are to be sintered into mechanical parts. However, this method is not limited to the above application. In other words, the present invention may also be employed for compressing other powdered materials utilized in various fields.

As mentioned above, it must be understood that the invention is in no way limited to the above embodiments and that many changes may be brought about therein without departing from the scope of the invention as defined by the appended claims.

What is claimed is:

1. An extrusion apparatus for extruding a powdered material, including a longitudinal die cavity into which the powdered material is charged, and a punch being adapted to be applied to an inlet of the die cavity for longitudinally pressing the powdered material charged in the die cavity to extrude the powdered material from an outlet of the die cavity, in which the die cavity comprises:

a constriction passage with an inclined surface for narrowing the constriction passage, said constriction passage constricting the powdered material by means of pressure from the punch longitudinally applied to the charged powdered material so that the powdered material is laterally compressed through the constriction passage into a consolidated mass product of the powdered material; and a core piece arranged between the inlet and the constriction passage and Spaced from the constriction passage, for distorting the powdered material as the powdered material passes over the core piece so that border surfaces which are formed between two successively charged portions of the powdered material when the powdered material is repeatedly charged are broken, whereby said two successively charged portions of the powdered material are continuously connected to each other at the constriction passage while said two successively charged portions are compressed.

2. The extrusion apparatus of claim 1, wherein the inclined surface is a curved surface having a truncated-cone shape.

3. The extrusion apparatus of claim 1, wherein the core piece is a thin piece fitted to the die cavity so as to be disposed in the die cavity parallel to the longitudinal direction of the die cavity.

4. The extrusion apparatus of claim 1, wherein the core piece is an axial piece located coaxially with respect to the die cavity.

5. The extrusion apparatus of claim 1, further comprising:

a longitudinal mandrel coaxially disposed in the die cavity for forming an inner bore on the product extruded from the die cavity.

6. The extrusion apparatus of claim 3, further comprising:

a longitudinal mandrel coaxially disposed in the die cavity for forming an inner bore on the product extruded from the die cavity.

7. The extrusion apparatus of claim 6, wherein the mandrel is a core rod integrally formed with the thin piece and longitudinally extending to the constriction passage.

8. The extrusion apparatus of claim 7, wherein the core rod further longitudinally extends to the inlet of the die cavity, and the punch has a receiving bore for receiving the core rod when the punch is applied to the die cavity.

9. The extrusion apparatus of claim 1, wherein the core piece is a thin piece which extends longitudinally to separate the die cavity along the longitudinal direction into two half sections.

10. The extrusion apparatus of claim 1, wherein the core piece includes a pair of wing portions which are twisted and inclined with respect to the longitudinal axis of the die cavity.

11. The extrusion apparatus of claim 1, said apparatus being structured and arranged for cold compression of a powdered metal.

* * * * *

UNITED STATES PATENT AND TRADEMARK OFFICE

CERTIFICATE OF CORRECTION

PATENT NO. : 5,437,545

DATED : August 1, 1995

INVENTOR(S) : Y. HIRAI

It is certified that error appears in the above-indentified patent and that said Letters Patent is hereby corrected as shown below:

At column 7, line 17, delete "in".
At column 7, line 33, change "48" to ---43---.
Column 8, line 26, change "3" to ---33---.
At column 9, line 51, change "is," to ---is---.
At column 10, line 1, change "Joined" to ---joined ---.
At column 10, line 56, change "the, -" to ---the---.
At column 10, line 57, change "core," to ---core---.
At column 11, line 39, change "pass" to ---portion ---.
At column 12, line 68, change "Joined" to ---joined ---.
At column 14, line 6, change "223." to ---223',---.
At column 14, line 31, change "M1"" to ---M1'---.
At column 17, line 20 (claim 1, line 18), change "Spaced" to ---spaced---.

Signed and Sealed this

Fifth Day of November, 1996

Attest:

BRUCE LEHMAN

*Attesting Officer* *Commissioner of Patents and Trademarks*